United States Patent
Boulakhov et al.

(10) Patent No.: US 10,052,700 B2
(45) Date of Patent: Aug. 21, 2018

(54) ROTARY CUTTING TOOL WITH BLADES HAVING REPEATING, UNEQUAL INDEXING AND HELIX ANGLES

(71) Applicant: Kennametal Inc., Latrobe, PA (US)

(72) Inventors: Sergei Vladimir Boulakhov, Nahariya (IL); Leonid Boris Sharivker, Nahariya (IL); Danny Ray Davis, Asheboro, NC (US); Frederick John Palmer, Studley (GB)

(73) Assignee: KENNAMETAL INC., Latrobe, PA (US)

( * ) Notice: Subject to any disclaimer, the term of this patent is extended or adjusted under 35 U.S.C. 154(b) by 421 days.

(21) Appl. No.: 14/810,677

(22) Filed: Jul. 28, 2015

(65) Prior Publication Data
US 2017/0028482 A1 Feb. 2, 2017

(51) Int. Cl.
*B23C 5/10* (2006.01)

(52) U.S. Cl.
CPC ........ *B23C 5/10* (2013.01); *B23C 2210/0492* (2013.01); *B23C 2210/282* (2013.01); *B23C 2210/405* (2013.01)

(58) Field of Classification Search
CPC ............... B23C 2210/405; B23C 5/10; B23C 2210/0492; B23C 2210/282
See application file for complete search history.

(56) References Cited

U.S. PATENT DOCUMENTS

| | | | | |
|---|---|---|---|---|
| 4,893,968 A * | 1/1990 | Levy | .......................... | B23C 5/10 407/53 |
| 4,963,059 A | 10/1990 | Hiyama | | |
| 5,350,261 A * | 9/1994 | Takaya | .................... | B23B 51/02 408/229 |
| 5,478,176 A * | 12/1995 | Stedt | ....................... | B23B 51/02 408/229 |
| 5,800,101 A * | 9/1998 | Jindai | ..................... | B23B 51/02 408/227 |
| 6,637,987 B2 * | 10/2003 | Lui | ......................... | B23B 51/02 407/54 |

(Continued)

FOREIGN PATENT DOCUMENTS

| | | |
|---|---|---|
| DE | 3413290 A1 | 10/1985 |
| JP | 9-136209 A | 5/1997 |

(Continued)

OTHER PUBLICATIONS

Feb. 20, 2017 Third Party Observations IL246132.

*Primary Examiner* — Sara Addisu
(74) *Attorney, Agent, or Firm* — Ian K. Samways (57) ABSTRACT

A rotary cutting tool with a longitudinal axis includes a shank portion and a cutting portion defining a length of cut. The cutting portion includes a plurality of blades separated by flutes extending along the length of cut. A first blade forms a first helix angle with respect to the longitudinal axis at the cutting tip. A second blade adjacent the first blade forms a second, different helix angle with respect to the longitudinal axis at the cutting tip. A third blade adjacent the second blade forms a third, different helix angle with respect to the longitudinal axis at the cutting tip. The first, second and third helix angles deviate by at least 2 degrees. The cutting edges of the first, second and third blades have unequal indexing.

19 Claims, 6 Drawing Sheets

(56) References Cited

U.S. PATENT DOCUMENTS

| | | | |
|---|---|---|---|
| 6,899,494 B2 | 5/2005 | Walrath | |
| 6,991,409 B2 | 1/2006 | Noland | |
| 7,306,408 B2 | 12/2007 | Wells et al. | |
| 7,367,754 B1 * | 5/2008 | Greenwood | B23C 5/10 407/59 |
| 7,789,597 B2 | 9/2010 | Wells et al. | |
| 2003/0118411 A1 * | 6/2003 | Flynn | B23C 5/10 407/53 |
| 2004/0057803 A1 * | 3/2004 | Walrath | B23C 5/10 407/54 |
| 2004/0101379 A1 * | 5/2004 | Mabuchi | B23B 51/02 408/230 |
| 2004/0120777 A1 * | 6/2004 | Noland | B23C 5/10 407/63 |
| 2008/0206000 A1 | 4/2008 | Sasu et al. | |
| 2011/0217132 A1 * | 9/2011 | Wells | B23C 5/10 407/54 |
| 2013/0170916 A1 | 7/2013 | Xu | |
| 2016/0052072 A1 * | 2/2016 | Davis | B23C 5/10 409/131 |
| 2016/0288222 A1 * | 10/2016 | Farrell | B23C 5/10 |

FOREIGN PATENT DOCUMENTS

| | | |
|---|---|---|
| JP | 2005-96048 A | 4/2005 |
| KR | 10-2006-0109536 A | 10/2006 |
| KR | 10-2013-0047962 A | 5/2013 |

* cited by examiner

ROTARY CUTTING TOOL WITH BLADES HAVING REPEATING, UNEQUAL INDEXING AND HELIX ANGLES

FIELD OF THE INVENTION

The present invention pertains to a rotary cutting tool with a plurality of helical cutting blades. More particularly, the present invention relates to an end mill with helical cutting blades having repeating, unequal indexing and helix angle at the cutting tip.

BACKGROUND OF THE INVENTION

Rotary cutting tools, such as end mills, typically have a cylindrical configuration that includes a shank portion and a cutting portion. The cutting portion contains a plurality of helically disposed cutting blades that extend from a first end (i.e., the "shank end") of the cutting portion adjacent the shank portion, toward the opposite end (i.e., the "free end") of the cutting portion. In some embodiments, the cutting edges of the helical teeth or blades are disposed along a substantially constant radius with respect to the longitudinal axis of the tool. In other embodiments, generally referred to as "tapered" cutting tools, the cutting portion is substantially frustoconical in shape; i.e., the cutting edge of each blade has a constantly decreasing or increasing radius with respect to the longitudinal axis of the tool as the cutting edge extends from the shank end of the cutting portion to the free end. The cutting edges of the blades in a tapered rotary cutting tool are at the same radius from the longitudinal axis of the tool in any plane through the cutting portion and perpendicular to the longitudinal axis of the tool. In still other end mill embodiments, generally referred to as "straight-fluted" rotary cutting tools, the cutting edges of the blades extend parallel to the longitudinal axis of the tool.

There are known rotary cutting tools in the art that have unequal indexing. These rotary cutting tools work in any ratio of the length of cut (LOC) to cutting diameter (D) (i.e., L-D ratio) because they have the same constant helix on all flutes. There is also known rotary cutting tools in the art that have unequal indexing and alternating helix angles on every other flute. These cutting tools have an advantage over the cutting tools with only the unequal index due the alternating tangential forces caused by the alternating helix angles. In other words, the alternating helix angles, along with the unequal indexing, helps to further reduce harmonics during a cutting operation.

However, rotary cutting tools with unequal indexing and alternating helix angles are limited by the L-D ratio in which the cutting tool can be produced. More specifically, the L-D ratio is typically limited to a maximum of 2×D simply because the flutes with the alternating helix angles will become closer to each other as the L-D ratio increases. Therefore, it is desirable to provide a rotary cutting tool that overcomes the shortcomings of the prior art.

SUMMARY OF THE INVENTION

The problem of a rotary cutting tool with unequal indexing and alternating helix angles being limited to a maximum L-D ratio is solved by providing a rotary cutting tool that has unequal helix angles with respect to the central, longitudinal axis that deviate by at least two (2) degrees that repeats for every three (3) blades, and having unequal angular spacing between adjacent blades at the cutting tip that repeats for every three (3) blades.

In one aspect of the invention, a rotary cutting tool with a longitudinal axis comprises a shank portion and a cutting portion extending from the shank portion to a cutting tip. The cutting portion has a length of cut, and a plurality of blades separated by flutes extending along the length of cut. Each of the blades includes a cutting edge at an intersection between a leading face and the land surface. A cutting edge of a first blade is formed at a first distance with respect to a cutting edge of a second blade adjacent the first blade. The cutting edge of the second blade is formed at a second distance with respect to a cutting edge of a third blade adjacent the second blade. The cutting edge of the third blade is formed at a third distance with respect to a cutting edge of a fourth blade adjacent the third blade. A first blade of the plurality of blades forms a first helix angle with respect to the longitudinal axis at the cutting tip, and a second blade of the plurality of blades adjacent the first blade forms a second, different helix angle with respect to the longitudinal axis at the cutting tip. The cutting edge of the first blade is formed at a first distance with respect to the cutting edge of the second blade. The cutting edge of the second blade is formed at a second distance with respect to the cutting edge of a third blade. The third blade of the plurality of blades adjacent the second blade forms a third, different helix angle with respect to the longitudinal axis at the cutting tip. The first, second and third helix angles deviate by at least two (2) degrees.

In another aspect of the invention, a rotary cutting tool with a longitudinal axis comprises a shank portion and a cutting portion extending from the shank portion to a cutting tip. The cutting portion has a length of cut, and a plurality of blades separated by flutes extending along the length of cut. Each of the blades includes a cutting edge at an intersection between a leading face and the land surface. A cutting edge of a first blade is formed at a first angular spacing with respect to a cutting edge of a second blade adjacent the first blade. The cutting edge of the second blade is formed at a second angular spacing with respect to a cutting edge of a third blade adjacent the second blade. The cutting edge of the third blade is formed at a third angular spacing with respect to a cutting edge of a fourth blade adjacent the third blade. A first blade of the plurality of blades forms a first helix angle with respect to the longitudinal axis at the cutting tip, and a second blade of the plurality of blades adjacent the first blade forms a second, different helix angle with respect to the longitudinal axis at the cutting tip. The cutting edge of the first blade is formed at a first distance with respect to the cutting edge of the second blade. The cutting edge of the second blade is formed at a second distance with respect to the cutting edge of a third blade. The third blade of the plurality of blades adjacent the second blade forms a third, different helix angle with respect to the longitudinal axis at the cutting tip. The first, second and third helix angles deviate by at least two (2) degrees.

In yet another aspect of the invention, a rotary cutting tool with a longitudinal axis comprises a shank portion and a cutting portion extending from the shank portion to a cutting tip. The cutting portion has a length of cut, and a plurality of blades separated by flutes extending along the length of cut. Each of the blades includes a cutting edge at an intersection between a leading face and the land surface. A cutting edge of a first blade is formed at a first distance with respect to a cutting edge of a second blade adjacent the first blade. The cutting edge of the second blade is formed at a second distance with respect to a cutting edge of a third blade adjacent the second blade. The cutting edge of the third blade is formed at a third distance with respect to a cutting edge of a fourth blade adjacent the third blade. A cutting edge of a first blade is formed at a first angular spacing with respect to a cutting edge of a second blade adjacent the first blade. The cutting edge of the second blade is formed at a second angular spacing with respect to a cutting edge of a third blade adjacent the second blade. The cutting edge of the third blade is formed at a third angular spacing with respect to a cutting edge of a fourth blade adjacent the third blade. A first blade of the plurality of blades forms a first helix angle with respect to the longitudinal axis at the cutting tip, and a second blade of the plurality of blades adjacent the first blade forms a second, different helix angle with respect to the longitudinal axis at the cutting tip. The cutting edge of the first blade is formed at a first distance with respect to the cutting edge of the second blade. The cutting edge of the second blade is formed at a second distance with respect to the cutting edge of a third blade. The third blade of the plurality of blades adjacent the second blade forms a third, different helix angle with respect to the longitudinal axis at the cutting tip. The first, second and third helix angles deviate by at least two (2) degrees.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
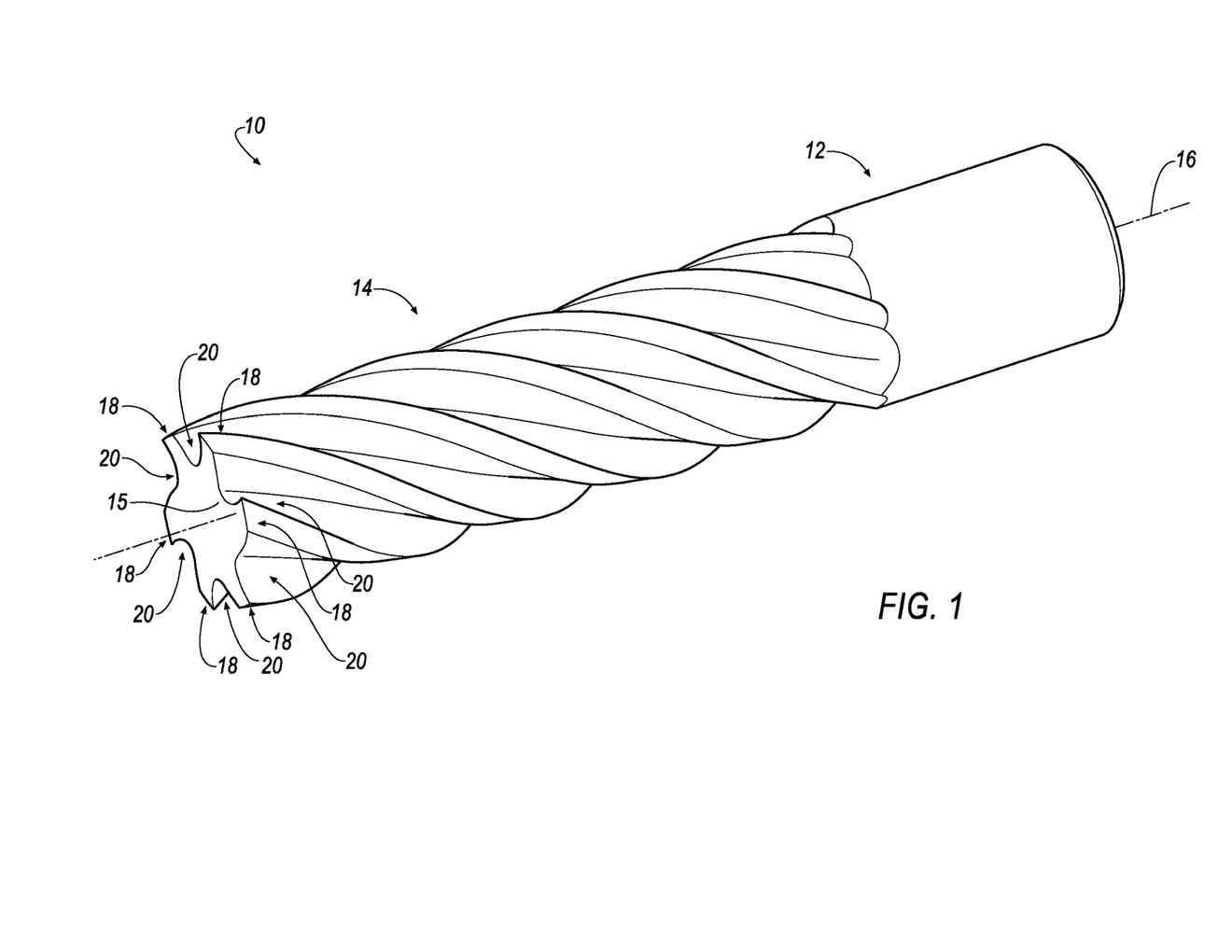
FIG. 1 is a perspective view of a rotary cutting tool having repeating unequal indexing and helix angles in accordance with an embodiment of the invention.
Figure 2:
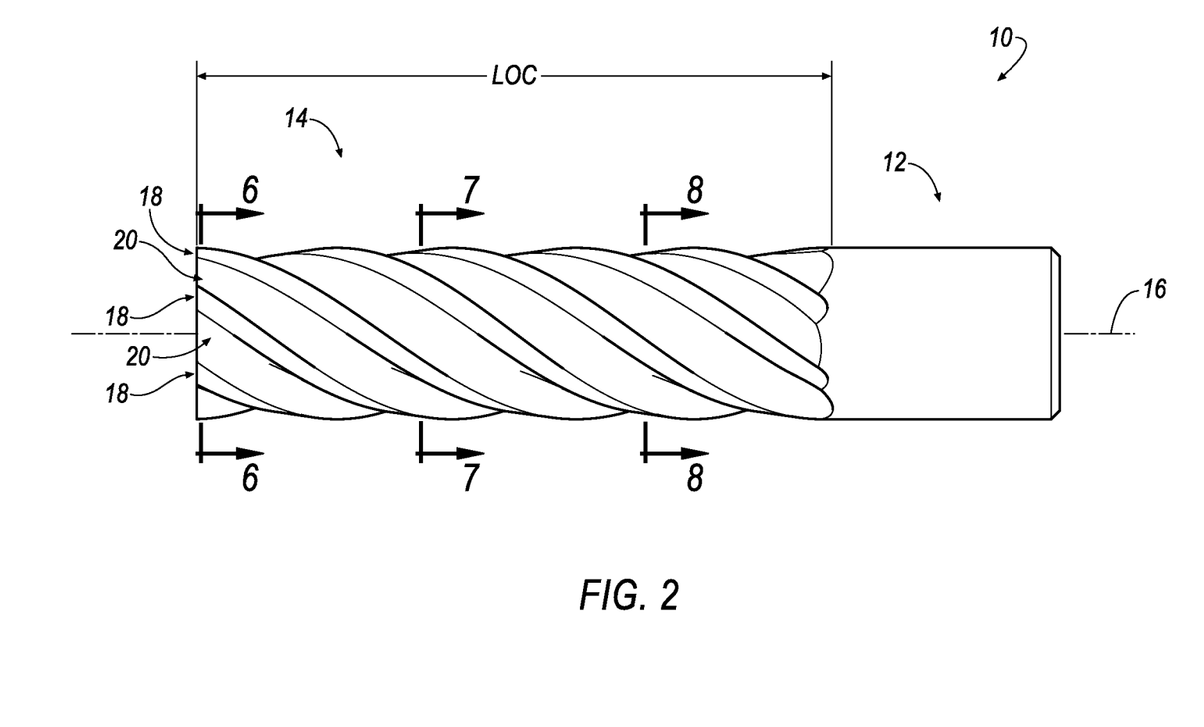
FIG. 2 is a side end view of the rotary cutting tool of FIG. 1.
Figure 3:
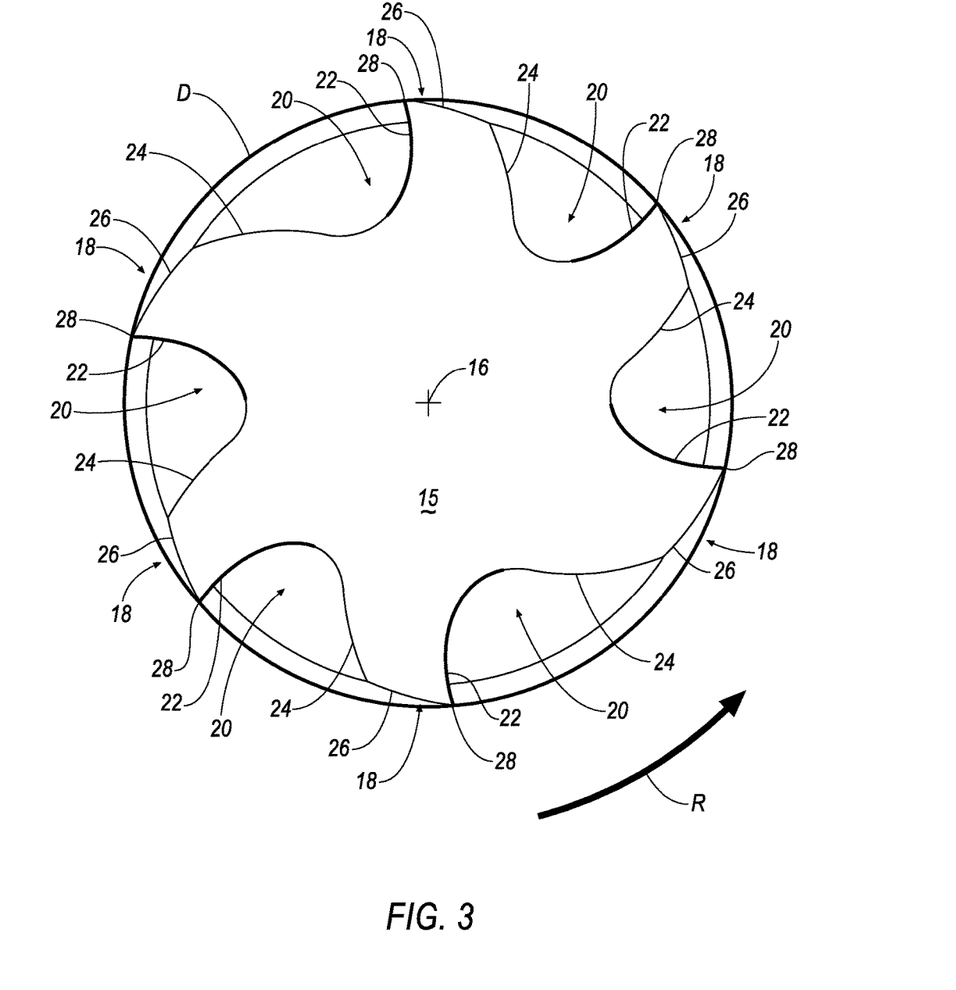
FIG. 3 is an enlarged end view of the rotary cutting tool of FIG. 1.

Referring now to FIGS. 1-3, a rotary cutting tool 10 includes a shank portion 12, a cutting portion 14 extending from the shank portion 12 to a cutting tip 15 along a length of cut (LOC), and a longitudinal axis 16. In the illustrated embodiment, the rotary cutting tool 10 comprises an end mill having a cutting diameter, D, of about 1.25 inches (31.75 mm), and a LOC of about 4.60 inches (116.84 mm). The overall shape of the cutting portion 14 of the cutting tool 10 may be, but is not limited to, a cylindrical shape, a frustoconical shape, and the like. The cutting portion 14 includes a plurality of blades 18 separated by flutes 20 extending the length of the cutting portion 14. The end mill 10 rotates in a direction of the arrow, R. In the illustrated embodiment, the rotary cutting tool 10 has a total of six (6) blades 18 and flutes 20. However, it will be appreciated that the invention is not limited by the number of blades and flutes, and that the invention can be practiced with a greater number of blades and flutes in increments of three (3) blades 18 (and flutes 20). For example, the invention can be practiced with nine (9) blades 18 (and flutes 20), twelve (15) blades 18 (and flutes 20), fifteen (15) blades 18 (and flutes 20), and the like.

Referring now to FIG. 3, each of the blades 18 has a leading face 22, a trailing face 24, and a land surface 26 bridging the leading face 22 and trailing face 24. The intersection between the leading face 22 and the land surface 26 forms a cutting edge 28 for the respective blade 18.

Figure 4:
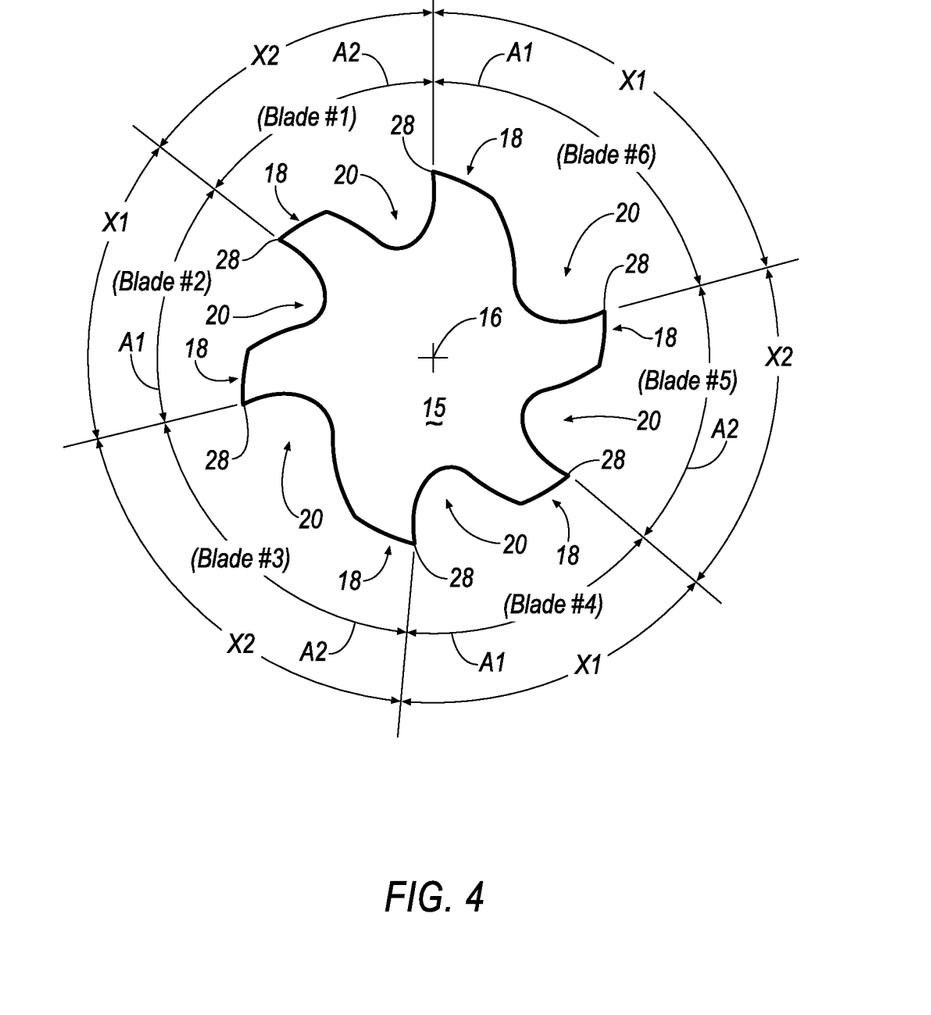
FIG. 4 is another enlarged end view of the rotary cutting tool of FIG. 1 showing the unequal indexing.

Referring now to FIG. 4, one aspect of the invention is that the angular spacing between the cutting edges 28 of adjacent blades 18 at the cutting tip 15 is unequal and repeats for every three (3) blades 18. Specifically, the angular spacing between the cutting edge 28 of blade #1 and the cutting edge 28 of blade #2 is A1 degrees, the angular spacing between the cutting edge 28 of blade #2 and the cutting edge 28 of blade #3 is A2 degrees, the angular spacing between the cutting edge 28 of blade #3 and the cutting edge 28 of blade #4 is A3 degrees. Similarly, the angular spacing between the cutting edge 28 of blade #4 and the cutting edge 28 of blade #5 is A1 degrees, the angular spacing between the cutting edge 28 of blade #5 and the cutting edge 28 of blade #6 is A2 degrees, and the angular spacing between the cutting edge 28 of blade #6 and the cutting edge 28 of blade #1 is A3 degrees. Thus, the angular spacing between the cutting edges 28 of adjacent blades 18 repeats for every three (3) blades 18.

In one example, the cutting edge 28 of blade #1 has an index of 4.8 degrees, the cutting edge 28 of blade #2 has an index of 60.0 degrees, the cutting edge 28 of blade #3 has an index of 115.0 degrees, the cutting edge 28 of blade #4 has an index of 184.8 degrees, the cutting edge 28 of blade #5 has an index of 240.0 degrees, and the cutting edge 28 of blade #6 has an index of 295.0 degrees. In this example, the angular spacing between the cutting edge 28 of blade #1 and the cutting edge 28 of blade #2 is 55.2 degrees (60.0 degrees–4.8 degrees), the angular spacing between the cutting edge 28 of blade #2 and the cutting edge 28 of blade #3 is 55.0 degrees (115.0 degrees–60.0 degrees), the angular spacing between the cutting edge 28 of blade #3 and the cutting edge 28 of blade #4 is 69.8 degrees (184.8 degrees–115.0 degrees), the angular spacing between the cutting edge 28 of blade #4 and the cutting edge 28 of blade #5 is 55.2 degrees (240.0 degrees–184.8 degrees), the angular spacing between the cutting edge 28 of blade #5 and the cutting edge 28 of blade #6 is 55.0 degrees (240.0 degrees–295.0 degrees), and the angular spacing between the cutting edge 28 of blade #6 and the cutting edge 28 of blade #1 is 69.8 degrees (364.8 degrees–295.0 degrees).

It will be appreciated that the invention is not limited to the magnitude of the angular spacing between adjacent blades 18, and that the invention can be practiced with any desirable magnitude of the angular spacing between adjacent blades 18, so long as the magnitude of the angular spacing between adjacent blades 18 repeats for every three blades 18.

Similar to the angular spacing A1, A1, A3 between the cutting edges 28 of adjacent blades 18 repeating for every three (3) blades 18, the distance X1, X2, X3 between the cutting edges 28 of adjacent blades 18 is also unequal and repeats for every three (3) blades 18. For example, in the illustrated embodiment, the distance between the cutting edge 28 of blade #1 and the cutting edge 28 of blade #2 is equal to X1, the distance between the cutting edge 28 of blade #2 and the cutting edge 28 of blade #3 is equal to X2, and the distance between the cutting edge 28 of blade #3 and the cutting edge 28 of blade #4 is equal to X3. Similarly, the distance between the cutting edge 28 of blade #4 and the cutting edge 28 of blade #5 is equal to X1, the distance between the cutting edge 28 of blade #5 and the cutting edge 28 of blade #6 is equal to X2, and the distance between the cutting edge 28 of blade #6 and the cutting edge 28 of blade #1 is equal to X3.

Figure 5:
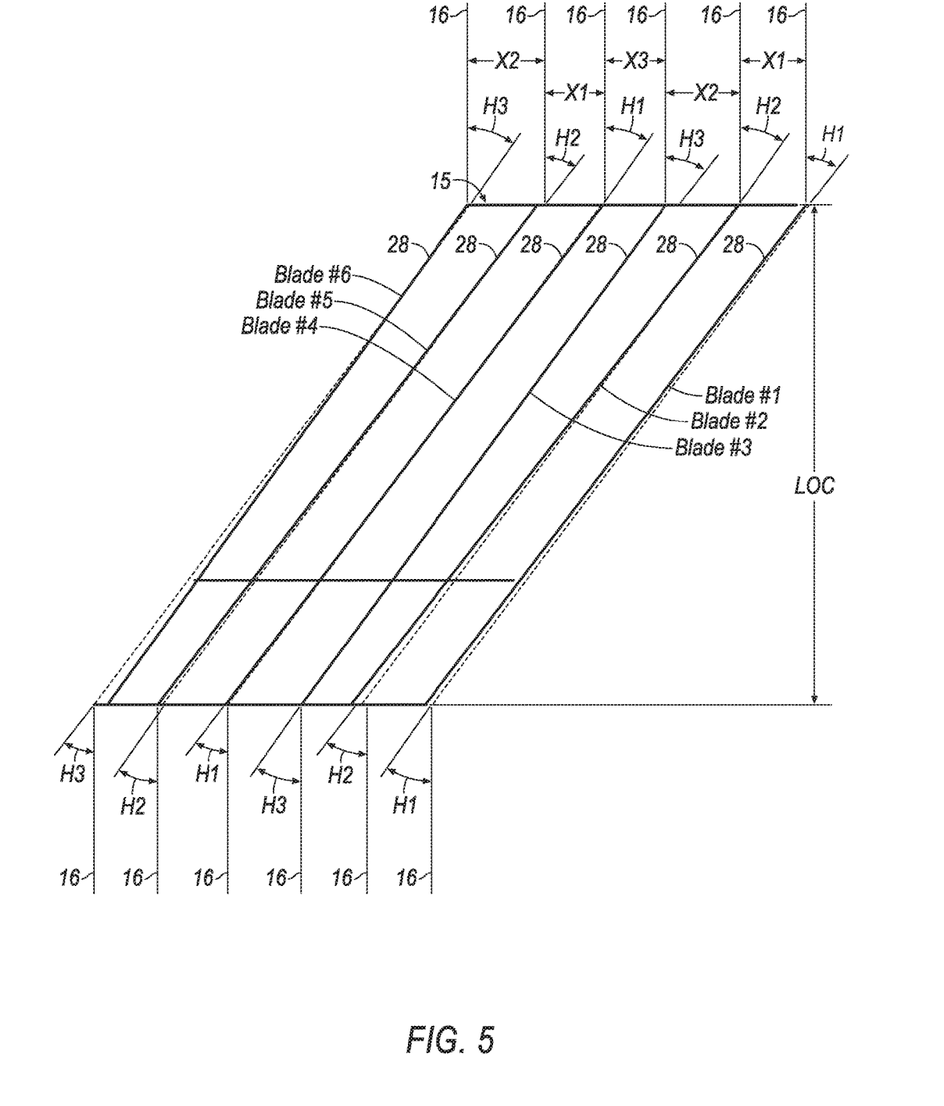
FIG. 5 is a schematic view of a six-fluted rotary cutting tool with unequal indexing and helix angles according to an embodiment of the invention.

Referring now to FIG. 5, another aspect of the invention is that the blades 18 at the cutting tip 15 have unequal helix angles with respect to the central, longitudinal axis 16 that deviate by at least 2 degrees and repeat for every three (3) blades 18. In one example, the helix angle of blade #1 at the cutting tip 15 is equal to H1, the helix angle of blade #2 at the cutting tip 15 is equal to H2, which is larger than the helix angle H1, and the helix angle of blade #3 at the cutting tip 15 is equal to H3, which is larger than the helix angles H1 and H2. Because the helix angle repeats for every three blades 18, the helix angle of blade #4 is equal to H1, the helix angle of blade #5 is equal to H2, and the helix angle for blade #6 is equal to H3.

In the illustrated embodiment, the helix angle, H1, is equal to 35 degrees, the helix angle, H2, is equal to 36 degrees, and the helix angle, H3, is equal to 37 degrees. Thus, the deviation between the smallest helix angle, H1, and the largest helix angle, H3, is at least 2 degrees. In another example, the helix angle, H1, is equal to 41 degrees, the helix angle, H2, is equal to 42 degrees, and the helix angle, H3, is equal to 43 degrees. Thus, the deviation between the smallest helix angle, H1, and the largest helix angle, H3, is at least 2 degrees.

However, it will be appreciated that the invention is not limited by the relative magnitude of the helix angles, H1, H2, H3 and that the invention can be practiced with any desirable helix angle, H1, H2, H3, so long as the deviation (i.e. difference) between the smallest and largest helix angle H1, H2, H3 is at least 2 degrees. For example, the helix angle, H1, can be 35 degrees, the helix angle, H2, can be greater than the helix angle, H1, such as 37 degrees, and the helix angle, H3, can be greater than both the helix angles H1, H2, such as 39 degrees.

As described above, the rotary cutting tool 10 of the invention has blades 18 at the cutting tip 15 that have unequal helix angles with respect to the central, longitudinal axis 16 that deviate by at least 2 degrees and repeat for every three (3) blades 18. In addition, the angular spacing between adjacent blades 18 at the cutting tip 15 is unequal and repeats for every three (3) blades 18. The combination of the unequal helix angle and the unequal angular spacing of the blades 18 enables the rotary cutting tool 10 of the invention to have a length of cut (LOC) of up to five (5) times the cutting diameter, D, (i.e., 5×D) unlike conventional rotary cutting tools having the capacity of only 2×D.

Figure 6:
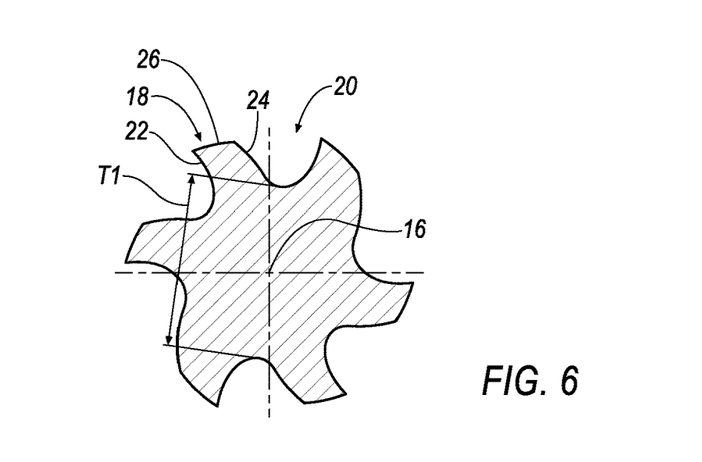
FIG. 6 is a cross-sectional view of the rotary cutting tool taken along line 6-6 in FIG. 2.
Figure 7:
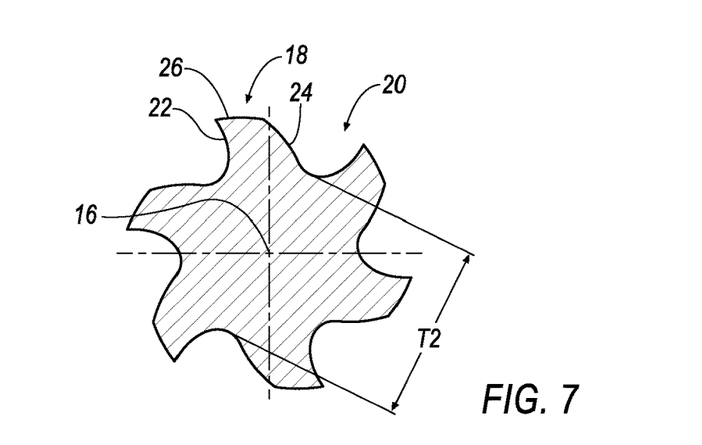
FIG. 7 is another cross-sectional view of the rotary cutting tool taken along line 7-7 in FIG. 2.
Figure 8:
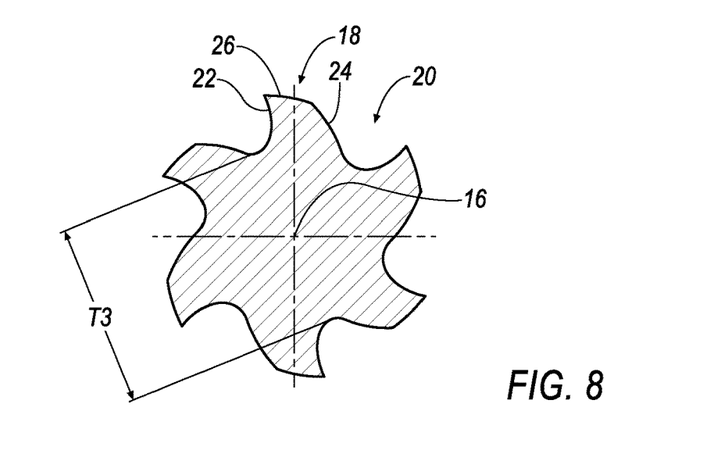
FIG. 8 is another cross-sectional view of the rotary cutting tool taken along line 8-8 in FIG. 2.

FIG. 6 shows a cross-sectional view of the cutting portion 14 at a distance of about 0.02 inches (0.5 mm) from the cutting tip 15. FIG. 7 shows a cross-sectional view of the cutting portion 14 at a distance of about 2.0 inches (50.8 mm) from the cutting tip 15. FIG. 8 shows a cross-sectional view of the cutting portion 14 at a distance of about 4.0 inches (101.6 mm) from the cutting tip 15.

In the illustrated embodiment, the core of the cutting portion 14 at the cutting tip 15 has a thickness of about 0.7500 inches (19.05 mm). As shown in FIG. 6, the core of the cutting portion 14 at a distance of about 0.02 inches (0.5 mm) from the cutting tip 15 has a thickness, T1, of about 0.7504 inches (19.06 mm). As shown in FIG. 7, the core of the cutting portion 14 at a distance of about 2.0 inches (50.8 mm) from the cutting tip 15 has a thickness, T2, of about 0.7717 inches (19.60 mm). As shown in FIG. 8, the core of the cutting portion 14 at a distance of about 4.0 inches (101.6 mm) from the cutting tip 15 has a thickness, T3, of about 0.7949 inches (20.19 mm). Thus, in the illustrated embodiment, the thickness of the core of the cutting portion 14 continuously increases from the cutting tip 15 toward the shank 12 defining a core profile of about 0.30 degrees. In other words, the depth of the flutes 20 in the cutting portion 14 varies along the longitudinal axis 16 of the rotary cutting tool 10 such that the depth of the flutes 20 in the cutting portion 14 is relatively less proximate the shank portion 12 and is relatively greater proximate the cutting tip 15.

However, it will be appreciated that the invention is not limited by the magnitude of the core profile (i.e. core taper), and that the invention can be practiced with any desirable core profile to produce desired cutting characteristics.

The patents and publications referred to herein are hereby incorporated by reference.

Having described presently preferred embodiments the invention may be otherwise embodied within the scope of the appended claims.

What is claimed is:

1. A rotary cutting tool with a longitudinal axis, comprising:
   a shank portion; and
   a cutting portion extending from the shank portion to a cutting tip, the cutting portion having a length of cut, and a plurality of blades separated by flutes extending along the length of cut, each of the blades including a cutting edge at an intersection between a leading face and the land surface,
   wherein a cutting edge of a first blade is formed at a first distance, X1, with respect to a cutting edge of a second blade adjacent the first blade, and wherein the cutting edge of the second blade is formed at a second distance, X2, with respect to a cutting edge of a third blade adjacent the second blade, and wherein the cutting edge of the third blade is formed at a third distance, X3, with respect to a cutting edge of a fourth blade adjacent the third blade,
   wherein the first blade of the plurality of blades forms a first helix angle with respect to the longitudinal axis at the cutting tip, and wherein the second blade forms a second, different helix angle with respect to the longitudinal axis at the cutting tip, and wherein the third blade of the plurality of blades adjacent the second blade forms a third, different helix angle with respect to the longitudinal axis at the cutting tip, and wherein the first, second and third helix angles deviate by at least 2 degrees; and
   at least one of the following features (a) and (b):
      (a) the first, second and third helix angles repeating among the plurality of blades; or
      (b) the first, second and third distances repeating among the plurality of blades.

2. The rotary cutting tool according to claim 1, wherein the first, second and third helix angles repeat for every three blades.

3. The rotary cutting tool according to claim 1, wherein the first, second and third distances repeat for every three blades.

4. The rotary cutting tool according to claim 1, wherein a depth of the flutes in the cutting portion is relatively less proximate the shank portion and is relatively greater proximate the cutting tip.

5. The rotary cutting tool according to claim 1, wherein a thickness of a core of the cutting portion continuously increases from the cutting tip toward the shank.

6. The rotary cutting tool according to claim 5, wherein the thickness of the core defines a core profile of about 0.30 degrees.

7. The rotary cutting tool according to claim 1, wherein a cutting edge of a first blade is formed at a first angular spacing, A1, with respect to a cutting edge of a second blade adjacent the first blade, and wherein the cutting edge of the second blade is formed at a second angular spacing, A2, with respect to a cutting edge of a third blade adjacent the second blade, and wherein the cutting edge of the third blade is formed at a third angular spacing, A3, with respect to a cutting edge of a fourth blade adjacent the third blade.

8. The rotary cutting tool according to claim 7, wherein the first, second and third angular spacings repeat for every three blades.

9. The rotary cutting tool according to claim 1, comprising both of the following features (a) and (b):
   (a) the first, second and third helix angles repeating among the plurality of blades; and
   (b) the first, second and third distances repeating among the plurality of blades.

10. A rotary cutting tool with a longitudinal axis, comprising:
   a shank portion; and
   a cutting portion extending from the shank portion to a cutting tip, the cutting portion having a length of cut, and a plurality of blades separated by flutes extending along the length of cut, each of the blades including a cutting edge at an intersection between a leading face and the land surface,
   wherein a cutting edge of a first blade is formed at a first angular spacing, A1, with respect to a cutting edge of a second blade adjacent the first blade, and wherein the cutting edge of the second blade is formed at a second angular spacing, A2, with respect to a cutting edge of a third blade adjacent the second blade, and wherein the cutting edge of the third blade is formed at a third angular spacing, A3, with respect to a cutting edge of a fourth blade adjacent the third blade,
   wherein the first blade of the plurality of blades forms a first helix angle with respect to the longitudinal axis at the cutting tip, and wherein the second blade forms a second, different helix angle with respect to the longitudinal axis at the cutting tip, and wherein the third blade of the plurality of blades adjacent the second blade forms a third, different helix angle with respect to the longitudinal axis at the cutting tip, and wherein the first, second and third helix angles deviate by at least 2 degrees; and
   at least one of the following features (a) and (b):
      (a) the first, second and third helix angles repeating among the plurality of blades; or
      (b) the first, second and third angular spacings repeating among the plurality of blades.

11. The rotary cutting tool according to claim 10, comprising both of the following features (a) and (b):
   (a) the first, second and third helix angles repeating among the plurality of blades; and
   (b) the first, second and third angular spacings repeating among the plurality of blades.

12. The rotary cutting tool according to claim 11, wherein the first, second and third angular spacings repeat for every three blades.

13. The rotary cutting tool according to claim 11, wherein the first, second and third helix angles repeat for every three blades.

14. The rotary cutting tool according to claim 11, wherein a depth of the flutes in the cutting portion is relatively less proximate the shank portion and is relatively greater proximate the cutting tip.

15. The rotary cutting tool according to claim 11, wherein a thickness of a core of the cutting portion continuously increases from the cutting tip toward the shank.

16. The rotary cutting tool according to claim 15, wherein the thickness of the core defines a core profile of about 0.30 degrees.

17. The rotary cutting tool according to claim 11, wherein a cutting edge of a first blade is formed at a first distance, X1, with respect to a cutting edge of a second blade adjacent the first blade, and wherein the cutting edge of the second blade is formed at a second distance, X2, with respect to a cutting edge of a third blade adjacent the second blade, and wherein the cutting edge of the third blade is formed at a third distance, X3, with respect to a cutting edge of a fourth blade adjacent the third blade.

18. The rotary cutting tool according to claim 17, wherein the first, second and third distances repeat for every three blades.

19. A rotary cutting tool with a longitudinal axis, comprising:
   a shank portion; and
   a cutting portion extending from the shank portion to a cutting tip, the cutting portion having a length of cut, and a plurality of blades separated by flutes extending along the length of cut, each of the blades including a cutting edge at an intersection between a leading face and the land surface,
   wherein a cutting edge of a first blade is formed at a first distance, X1, with respect to a cutting edge of a second blade adjacent the first blade, and wherein the cutting edge of the second blade is formed at a second distance, X2, with respect to a cutting edge of a third blade adjacent the second blade, and wherein the cutting edge of the third blade is formed at a third distance, X3, with respect to a cutting edge of a fourth blade adjacent the third blade, and wherein the first, second and third distances repeat for every three blades, and
   wherein a cutting edge of a first blade is formed at a first angular spacing, A1, with respect to a cutting edge of a second blade adjacent the first blade, and wherein the cutting edge of the second blade is formed at a second angular spacing, A2, with respect to a cutting edge of a third blade adjacent the second blade, and wherein the cutting edge of the third blade is formed at a third angular spacing, A3, with respect to a cutting edge of a fourth blade adjacent the third blade, wherein the first, second and third angular spacing repeats for every three blades, and
   wherein the first blade of the plurality of blades forms a first helix angle with respect to the longitudinal axis at the cutting tip, and wherein the second blade forms a second, different helix angle with respect to the longitudinal axis at the cutting tip, and wherein the third blade of the plurality of blades adjacent the second blade forms a third, different helix angle with respect to the longitudinal axis at the cutting tip, and wherein the first, second and third helix angles deviate by at least 2 degrees.

* * * * *